(12) United States Patent  
Plankl (10) Patent No.: US 9,287,983 B2  
(45) Date of Patent: Mar. 15, 2016

(54) OPTICAL DATA TRANSMISSION SYSTEM

(75) Inventor: Helmut Plankl, Ingolstadt (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 862 days.

(21) Appl. No.: 13/541,807

(22) Filed: Jul. 5, 2012

(65) Prior Publication Data

US 2013/0011026 A1 Jan. 10, 2013

(30) Foreign Application Priority Data

Jul. 6, 2011 (DE) .......................... 10 2011 106 783

(51) Int. Cl.
| | |
|---|---|
| *H04B 10/00* | (2013.01) |
| *H04B 10/12* | (2006.01) |
| *H04B 10/278* | (2013.01) |
| *G02B 6/28* | (2006.01) |

(52) U.S. Cl.
CPC ............ *H04B 10/278* (2013.01); *G02B 6/2817* (2013.01)

(58) Field of Classification Search
USPC .......................... 398/140, 141, 151, 169, 170
See application file for complete search history.

(56) References Cited

U.S. PATENT DOCUMENTS

| | | | | |
|---|---|---|---|---|
| 4,053,764 | A * | 10/1977 | Sierak et al. ............. | 250/227.24 |
| 4,867,520 | A | 9/1989 | Weidel | |
| 4,898,095 | A * | 2/1990 | Tasaki et al. .................. | 102/201 |
| 5,359,405 | A * | 10/1994 | Andrews ....................... | 356/35.5 |
| 5,745,619 | A * | 4/1998 | Li et al. ............................ | 385/48 |
| 7,025,508 | B2 * | 4/2006 | Kopf et al. ....................... | 385/77 |
| 2002/0061172 | A1 * | 5/2002 | Kuroha et al. .................. | 385/78 |
| 2005/0110979 | A1 * | 5/2005 | Harres .......................... | 356/73.1 |
| 2006/0043268 | A1 * | 3/2006 | Abrate et al. ............ | 250/227.14 |
| 2007/0216988 | A1 * | 9/2007 | Caplan .......................... | 359/325 |
| 2009/0080880 | A1 * | 3/2009 | Lee et al. ......................... | 398/14 |
| 2009/0128153 | A1 * | 5/2009 | Graesslin et al. .......... | 324/322 |
| 2010/0008676 | A1 * | 1/2010 | Kojima et al. ................ | 398/141 |
| 2012/0020672 | A1 * | 1/2012 | Aguren .......................... | 398/139 |
| 2012/0050191 | A1 * | 3/2012 | Higashida et al. ............. | 345/173 |
| 2013/0148109 | A1 * | 6/2013 | Bei et al. ...................... | 356/73.1 |
| 2013/0163986 | A1 * | 6/2013 | Mamyshev et al. ............. | 398/25 |
| 2013/0259469 | A1 * | 10/2013 | Smith et al. ..................... | 398/16 |
| 2014/0133847 | A1 * | 5/2014 | Vall-Llosera et al. .......... | 398/21 |
| 2014/0291490 | A1 * | 10/2014 | Hanson et al. ............ | 250/214 R |

FOREIGN PATENT DOCUMENTS

| | | |
|---|---|---|
| EP | 0 053 324 A2 | 6/1982 |
| EP | 0 811 860 A2 | 12/1997 |

OTHER PUBLICATIONS

European Search Report with partial English Translation dated Oct. 24, 2012 (eight (8) pages).

\* cited by examiner

*Primary Examiner* — David Payne  
*Assistant Examiner* — Pranesh Barua  
(74) *Attorney, Agent, or Firm* — Crowell & Moring LLP (57) ABSTRACT

A data transmission between a device and a first and a second optical maintenance port involves a transmission reflector in the form of a solid-state bound data line having a gap and a Y coupler. This allows recording of the communication between the device to be read out and the first optical maintenance port in real time by means of the second optical port. Likewise, communication by means of electromagnetic energy is possible between the first and the second optical maintenance ports.

11 Claims, 8 Drawing Sheets

OPTICAL DATA TRANSMISSION SYSTEM

CROSS-REFERENCE TO RELATED APPLICATIONS

The present application claims priority under 35 U.S.C. §119 to German Application No. 10 2011 106 783.7, filed Jul. 6, 2011, the entire disclosure of which is herein expressly incorporated by reference.

FIELD OF THE INVENTION

Exemplary embodiments of the present invention relate to the optical data transmission and/or optical readout of data of a device. In particular, exemplary embodiments of the present invention related to an optical data transmission system, an aircraft having an optical data transmission system, the use of an optical data transmission system in an aircraft and a method for readout of data of a device.

TECHNOLOGICAL BACKGROUND

Complex technical devices today usually have their own internal software. Such devices can generate data that is of interest for the user or for a method for checking the device. Such data may then be read out via optical ports, for example, and forwarded to diagnostic devices. Especially in the field of aviation technology, readout and checking of systems of an airplane by a diagnostic module is extremely important. To do so, for example, a diagnostic module may be connected via an optical bus to the aircraft to perform a diagnostic method with regard to the aviation systems. Various signals may be transmitted from the connected diagnostic module to the aircraft and vice-versa by means of electromagnetic energy.

However, errors may occur in readout, performing the diagnostic method, or loading software. In the past, the state of the art has provided only a port on an aircraft for subjecting the aircraft to a diagnostic procedure by means of optical data transmission. It is impossible here to check the performance while performing the diagnostic procedure as part of maintenance and to forward any errors detected to the user.

So-called 3Y solutions in which three different Y couplers are used between an optical port and a device are known in the state of the art. These are extremely impractical with regard to their dimensions, lengthening the optical path for the signals, significantly increasing damping and causing substantial costs for the manufacturer. This approach from the state of the art also leads to inadequacies when there are great temperature differences.

SUMMARY OF THE INVENTION

Exemplary embodiments of the present invention provide an improved data transmission between a device and an optical maintenance port.

Exemplary embodiments of the present invention are directed to an optical data transmission system, an aircraft having an optical data transmission system, the use of an optical data transmission system in an aircraft and a method for readout of data of a device.

The exemplary embodiments described here relate equally to the optical data transmission system, the aircraft, the use and the method. In other words, features described below with respect to the optical data transmission system are likewise implemented in the aircraft and are also regarded as being feature of the method and vice-versa.

According to one exemplary embodiment of the invention, an optical data transmission system having a device, a first optical maintenance port and a second optical maintenance port are provided. In addition, the optical data transmission system has a solid-state bound data line for transmission of data by means of electromagnetic energy between the device and the first optical maintenance port and the second optical maintenance port. In addition, the solid-state bound data line of the optical data transmission system is interrupted by a gap between the device on the one hand and the first and second optical maintenance ports on the other hand.

In this exemplary embodiment as well as in each further embodiment, the device may be embodied as an aircraft and the ports may be embodied as optical test or maintenance ports.

The invention provides the option of a second independent diagnosis in which software can be loaded directly via the ground port without having to dismantle the devices for loading out of the aircraft. Therefore, the invention also relates to maintenance. Thus within the scope of the invention, the software can be updated via the port as part of the maintenance.

The solid-state bound data line according to the invention allows a transmission of data between the device and the optical maintenance ports. The solid-state bound data line also permits a transmission of data between the first optical maintenance port and the second optical maintenance port due to the gap. In addition, if desired, an optical splitter may also be present in the data transmission system in addition to the gap in the solid-state bound data line. This is explained in greater detail below.

In other words, the device is connected to the first and second optical maintenance ports for transmission of data by means of electromagnetic energy via the solid-state bound data line. In other words, despite the solid-state bound data line having a gap, optical energy can be transmitted from the device to the first optical port and to the second optical port as well as being transmitted from the first optical port to the second optical port and vice-versa. Furthermore, the device can be read out by a diagnostic module or a maintenance module, which is also described in greater detail below. Such a diagnostic module may be connected to one of the optical maintenance ports and may transmit signals to the device or receive data from it via the solid-state bound data line having a gap. In other words, the device may be optically connected by the optical data transmission system to a diagnostic module, so that on the whole this yields a test system, a maintenance system or a diagnostic system for the device.

A parallel and simultaneous readout of two devices or two parts of one device is possible due to the two optical maintenance ports, and this can be save time for the user.

In this exemplary embodiment as well as in all others, the device may be embodied as an aircraft, for example, as an airplane. In addition, the device may also be embodied as an airplane system, which can be read out by means of an additional diagnostic module via the optical data transmission system provided according to the invention. Furthermore, if desired a corresponding diagnostic module may be supplied according to another exemplary embodiment of the invention.

On the basis of the second optical maintenance port, it is now possible to increase the diagnostic capability of the device to be read out and/or to be monitored and/or to be analyzed, i.e., for example, the airplane, by adding an additional independent system. Based on the inventive gap in the solid-state bound data line, communication between the first and second optical maintenance ports is also enabled.

Likewise, because of the inventive gap in the solid-state bound data line, it is possible for the data exchange, i.e., the communication between the first optical maintenance port and the device, to be recorded via the second optical maintenance port. In doing so, the communication, i.e., data exchange between the device and the first optical port, can be differentiated into two types of data exchange. In a first variant, data is sent from the device to the first optical maintenance port and/or to an instrument connected there. This may be referred to as the first direction of data exchange. The optical signals transmitted across the gap are split by using an optical splitter into a part that propagates to the first optical maintenance port and a part that propagates to the second optical maintenance port. Thus, in this case of data exchange, it is possible to record at the second optical maintenance port what is also arriving from the device in a similar manner at the first optical maintenance port. The opposite direction may be considered as the second variant, in which data and/or signals or a signal is/or sent to the device from the first optical maintenance port or to an instrument connected thereto. This signal sent by the first optical maintenance port is transmitted via the gap that is present in the solid-state bound data line as well as being reflected on the gap which is present there. This reflected portion then propagates back to the first optical maintenance port because of the optical splitter that is present but also propagates to the second optical maintenance port. It is thus also possible at the second optical maintenance port to record the signals emanating from the first optical maintenance port.

Because of the gap that is present and because of the desired reflection of the electromagnetic signals, which occurs there and is used in a targeted manner, it is also possible to allow communication between the two optical maintenance ports and/or between instruments connected to these two optical maintenance ports. This will be described in greater detail below.

The gap in this and any other exemplary embodiment may be an air gap. However, it is also possible for the gap to be embodied as a change in the refractive index and for various solid-state materials to be aligned in a row along a propagation path of the electromagnetic energy in the data line. For example, it is possible to achieve the results that optimal transmission properties and reflection properties exist and/or occur at the corresponding boundary layers of the various materials within the data line. For example, zirconia may be used as the material in the gap. In other words, a data line is produced which has in a gap-like section a material that is different from the remaining data line with regard to its refractive index.

The material zirconia may be used in several ways in the invention. In addition to ceramic, zirconia may be used as a very temperature-constant spacer in the form of a clamping sleeve. This serves to adjust and maintain the gap.

In addition, zirconia may be used as a medium in the gap because of its very high refractive index. This supplies a good rereflection of the electromagnetic signal. In addition, zirconia as a zirconia wafer may be combined as a medium in the gap and at the same time used as a spacer. This relates to all the exemplary embodiments of the invention.

In this exemplary embodiment and in all the others, the gap is a transmission reflector that enables parallel recording of the process and/or communication between the device and the first optical maintenance port as well as enabling communication between the first and the second optical maintenance ports.

The gap may be, for example, 10μm long. However, a length of 5 μm or 15 μm is also possible. Other gap lengths are also possible. The gap length and/or width may be adapted as described above to the optical wavelength used, so that any extinctions due to interference can be prevented. In addition, to the wavelength, it may also be coordinated with the materials used and the refractive indices thereby used. In the event that optical fibers such as glass fibers are used, the gap length may also be adapted to the numerical aperture of the fibers.

In addition, the gap in the solid-state bound data line may be coordinated with the optical wavelength used. Since reflections occur at each interface of different refractive indices, the distance and/or width of the gap can be coordinated with this optical wavelength. It is thus possible to prevent optical extinctions occurring due to interference when such an inventive gap is provided. In addition, other materials may also be used in the gap, for example, fluids, sputtered metals, plexiglass or films as well as zirconia.

Materials that undergo minor changes in ambient influences such as temperature fluctuations or atmospheric humidity may be used.

With respect to gap, it should be pointed out that multiple gaps in a row or material combinations with one another may also be provided.

For example, the following combination may be used: glass fiber—layer of a sputtered metal—air—layer of a sputtered metal—glass fiber. However, glass fiber—zirconia wafer—glass fiber is also possible.

For example, materials which undergo only minor change when there are temperature fluctuations may also be used.

The invention presented here makes it possible to achieve an inexpensive readout of data from a device and/or an inexpensive diagnosis of a device. In comparison with the 3Y approach known in the state of the art, the optical data transmission system according to the invention is of a much smaller size and therefore also has advantages with regard to weight in addition, to advantages in dimension. Likewise, the optical data transmission system has proven to be extremely robust. In comparison with the state of the art, the present invention also withstands greater temperature differences, which may be extremely important in military use or in other field uses.

According to one exemplary embodiment of the invention, the solid-state bound data line is a fiber optic data line, at least directly before and directly after the gap.

In other words, the optical data line consists at least in part of a glass fiber which can transmit optical signals from the device to the optical ports and vice-versa. If desired, the gap may be filled with zirconia as a material to provide the desired reflection and transmission properties within the solid-state bound data line.

According to another exemplary embodiment of the invention, the solid-state bound data line has an optical signal splitter.

The optical signal splitter may be embodied as Y coupler, for example. This embodiment can be derived from FIG. 1, for example. The optical signal splitter makes it possible for the signals coming from the device to be directed into a first channel of the solid-state bound data line and at the same time to be directed into a second channel of the solid-state bound data line. Thus, both the first and the second optical maintenance ports may be supplied with the signals sent by the device. Likewise, the optical signal splitter ensures that the electromagnetic signals emanating from an optical maintenance port are not only sent to the device but are also reflected on the gap and are then input into the next channel to the other optical maintenance port.

According to another exemplary embodiment of the invention, the solid-state bound data line has a first segment of data line between the device and the gap. In addition, the data line has a second segment between the gap and the optical signal splitter. Furthermore, the optical data line has a third segment between the optical signal splitter and the first optical maintenance port and has a fourth segment between the optical signal splitter and the second optical maintenance port.

The architecture of the data transmission system can be derived from the figures in the corresponding following description of figures. This architecture of the data transmission system allows communication between the device and the first maintenance port to be recorded and documented at the second maintenance port in addition, to increasing the diagnostic capability of the device. Likewise, data transmission and/or communication between the first and second optical maintenance ports is/are possible because of the optical data splitter and the combination with the gap which ensures the rereflection.

According to another exemplary embodiment of the invention, the first and the second segments of data line are embodied in conjunction with the gap such that in transmission of electromagnetic energy across the gap, a damping of the electromagnetic energy occurs, selected from the group consisting of 0.2 dB, 0.5 dB, 1.0 dB, 1.5 dB, 2.0 dB, 2.5 dB, 3.0 dB.

Damping in the ranges given above is appropriate for this exemplary embodiment because the largest possible portion of the signal is to be transmitted. There is a determination of how high the transmission rate should be for an electromagnetic signal based on the refractive index of the first and second segments of the data line and by means of the refractive index in between in the region of the gap. Likewise this transmission rate can be influenced by the width of the gap. The refractive indices used and the gap width are coordinated with the fact that at a given wavelength, the desired damping value with respect to the transmission of electromagnetic energy is achieved via the gap. In other words, the first and second segments of the data line in combination with the gap and in combination with the wavelength used are embodied in this exemplary embodiment, so that damping occurs in the upper range given above with respect to the transmission.

A fiber optic data line in combination with a wavelength of 800 nm, for example, may preferably be used. However, other combinations of data lines and wavelengths are also possible. If desired, zirconia may be used as the material in the gap. This has special advantages, and data exchange via zirconia manifests extremely minor changes when there are temperature fluctuations and thus permits a stable data transmission. However, it does not go beyond the scope of the invention if other materials different from zirconia are used in the gap.

According to another exemplary embodiment of the invention, the first and the second segments of the data line in combination with the gap are embodied, so that in reflection of electromagnetic energy coming from an optical maintenance port, which is reflected on the gap, there is damping of the electromagnetic energy of an extent selected from the group consisting of 6 dB, 6.5 dB, 7.0 dB, 7.5 dB, 8.0 dB, 8.5 dB, 9.0 dB, 9.5 dB, 10.0 dB, 10.5 dB, 11 dB, 11.5 dB, 12 dB, 12.5 dB, 13.0 dB, 13.5 dB and 14.0 dB.

In other words, the first and the second segments of the data line are coordinated with the gap width with regard to their refractive indices, and the gap material is coordinated with the wavelength used with regard to the refractive index of the gap material, so that the measure of damping of the reflection mentioned above occurs. The skilled person will made this selection without any technical hurdles and with going beyond the scope of the invention.

According to another exemplary embodiment of the invention, the optical data transmission system has a diagnostic module for connection to at least one of the two optical maintenance ports such that the diagnostic module is embodied to perform a test on the device.

In other words, this provides a diagnostic system for the device. Likewise a recording module may be connected to the second optical maintenance port in order to record and document the maintenance measure performed on the first maintenance port.

Due to the two optical maintenance ports, a parallel and simultaneous readout of two devices or of two parts of the device is possible, and this can means time savings for the user or mutual control of the data flow and thus an increase in security.

According to another exemplary embodiment of the invention, an airplane having an optical data transmission system is provided, as described above or below.

According to another exemplary embodiment of the invention, the use of an optical data transmission system as described above or below is provided in an airplane.

According to another exemplary embodiment of the invention, a method for readout of data from the device is provided. The method here has as its first step providing a gap in a solid-state bound data line such that the data line is located between a device on the one hand and a first and a second optical maintenance port on the other hand. In addition, the method comprises the transmission of an electromagnetic signal between the device and the first optical maintenance port via the solid-state bound data line. The transmission may take place in a first direction from the device to the first optical maintenance port and in a second direction from the first optical maintenance port to the device. As an additional step, the method includes detection of an electromagnetic signal transmitted across the gap at the second optical maintenance port if the transmission is in the first direction. In the case of the transmission in the second direction indicated above, an electromagnetic signal reflected on the gap is detected at the second optical maintenance port.

The detecting may be performed by the optical maintenance port or by an instrument connected to the optical maintenance port.

In other words, this provides a method that makes it possible to rapidly and reliably read out a device. Since the output process and/or the maintenance or diagnostic process can be recorded simultaneously at the second optical maintenance port, any errors in performing the maintenance or the diagnosis can be discovered, and this information can be forwarded to the user. This can be accomplished, for example, by means of optical or acoustic warning signals to the user. This provides an inexpensive method that is technically simple to install and requires little damping while needing only very little additional data line in comparison with the state of the art. To do so, for example, if desired, an optical splitter such as that in a Y coupler may be used. Based on detection of signals in the second channel of the second optical maintenance port, the second channel being supplied by the optical splitter, it is possible to record the communication between the device and the first optical maintenance port in real time.

According to another exemplary embodiment, the method includes providing a device, a first optical maintenance port and a second optical maintenance port. In addition, the method includes providing a solid-state bound data line for transmission of data by means of electromagnetic energy between the device and the first optical maintenance port and the second optical maintenance port.

This and any other exemplary embodiment of the invention may also be executed as an error diagnosis method for inspecting aircraft by means of a diagnostic module and by means of the method steps already described here.

According to another exemplary embodiment of the invention, the method includes the step of recording an electromagnetic signal on the second optical maintenance port, the signal being transmitted through or reflected on the gap to the second optical maintenance port. Therefore, there is monitoring of the communication between the first optical maintenance port and the device by detection of the electromagnetic signals incoming at the second optical maintenance port.

In other words, overhearing, eavesdropping or secret tapping of the communication and/or the data exchange in the first optical maintenance port and the device may take place there. This may be done in real time. Likewise an independent diagnosis of the device in real time is also made possible. Then any type of data transmission such as frequency modulation, wavelength modulation or amplitude modulation may be used. This may also be regarded as a diagnostic option for optional switches where a check is performed of whether the switches have been switched correctly.

According to another exemplary embodiment of the invention, the method includes the step of communication between the first optical maintenance port and the second optical maintenance port by means of an electromagnetic signal reflected back at the gap.

In other words, the communication described here takes place by sending an optical signal through one of the optical maintenance ports and/or through an instrument which is connected to one of the optical maintenance ports. A predefined portion of this signal is reflected on the inventive gap because of the change in refractive index there and is sent to the respective other optical maintenance port and/or to the device connected there. In other words, the gap with its change in refractive index may be utilized to transmit a portion of the signal through the gap and to reflect a portion of the signal on the gap. This makes it possible for the first optical maintenance port and/or an instrument connected there to regulate or control the second optical maintenance port and/or an instrument connected there.

Preferred exemplary embodiments of the invention are described below with reference to the figures.

BRIEF DESCRIPTION OF THE FIGURES

The diagrams in the figures are schematic and are not drawn to scale. The same reference numerals are used for the same or similar elements in the descriptions of the figures. The present invention can essentially be used for various devices.

DETAILED DESCRIPTION OF EXEMPLARY EMBODIMENTS

Figure 1:
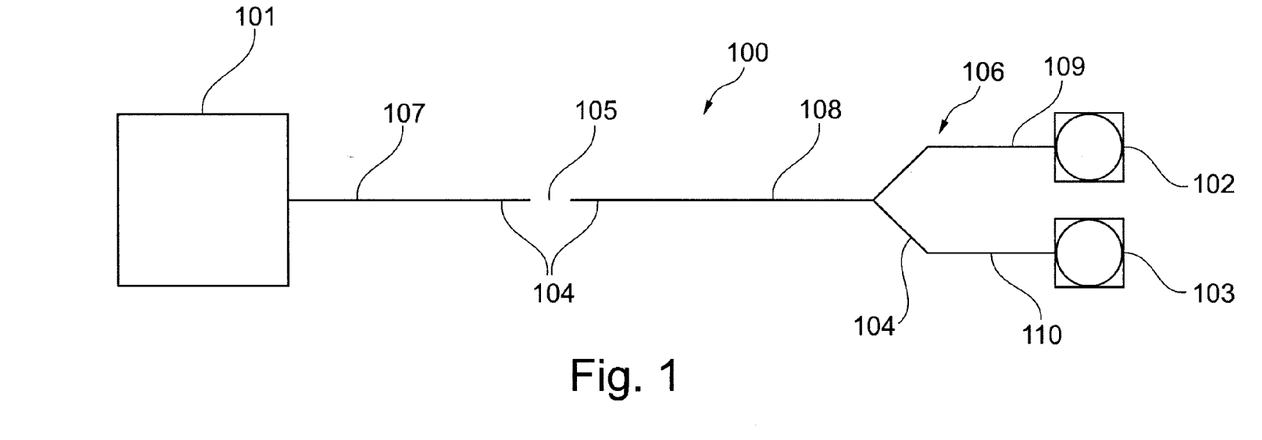
FIGS. 1 to 3 show schematic two-dimensional diagrams of optical data transmission systems according to different exemplary embodiments of the invention.

FIG. 1 shows an optical data transmission system 100 having a device 101, a first optical maintenance port 102 and a second optical maintenance port 103. In addition, the optical data transmission system has a solid-state bound data line 104 for transmitting data by means of electromagnetic energy between the device 101 and the first optical maintenance port 102 and the second optical maintenance port 103. This solid-state bound data line is embodied here as a fiber optic data line. The fiber optic data line 104 is interrupted by the gap 105 between the device on the one hand and the first and the second optical maintenance ports on the other hand. In the exemplary embodiment shown here, the gap, shown here as an interruption 105, is embodied with air as the material in the gap and zirconia as the spacer sleeve between the glass fiber segments of the data line. The spacer may be embodied in the form of a clamping sleeve or a wafer or a spacer ring. This can be derived from the following FIGS. 8A through 11.

The device 101 may be embodied, for example, as a system of an aircraft or as the entire aircraft. In addition, an optical signal splitter 106 is shown, splitting the optical signal which travels in FIG. 1 from left to right in the second segment 108 of the data line, into signals into the two segments 109 and 110 of the data line. The architecture of the data transmission shown here includes a first segment 107 of the data line between the device and the gap. A second segment 108 of the data line is situated between the gap and the optical signal splitter. The third segment 109 of the solid-state bound data line is situated between the optical signal splitter and the first optical maintenance port. The fourth solid-state segment of the data line is situated between the optical signal splitter and the second optical maintenance port. Because of the combination of the optical signal splitter 106 which may also be referred to as a Y coupler and the gap 105 which also includes a change in the refractive index, communication between the device 101 and the first optical maintenance port 102 can both be recorded at the second optical maintenance port 103. In addition, communication between the two optical maintenance ports can be made possible by this combination according to the invention.

Figure 2:
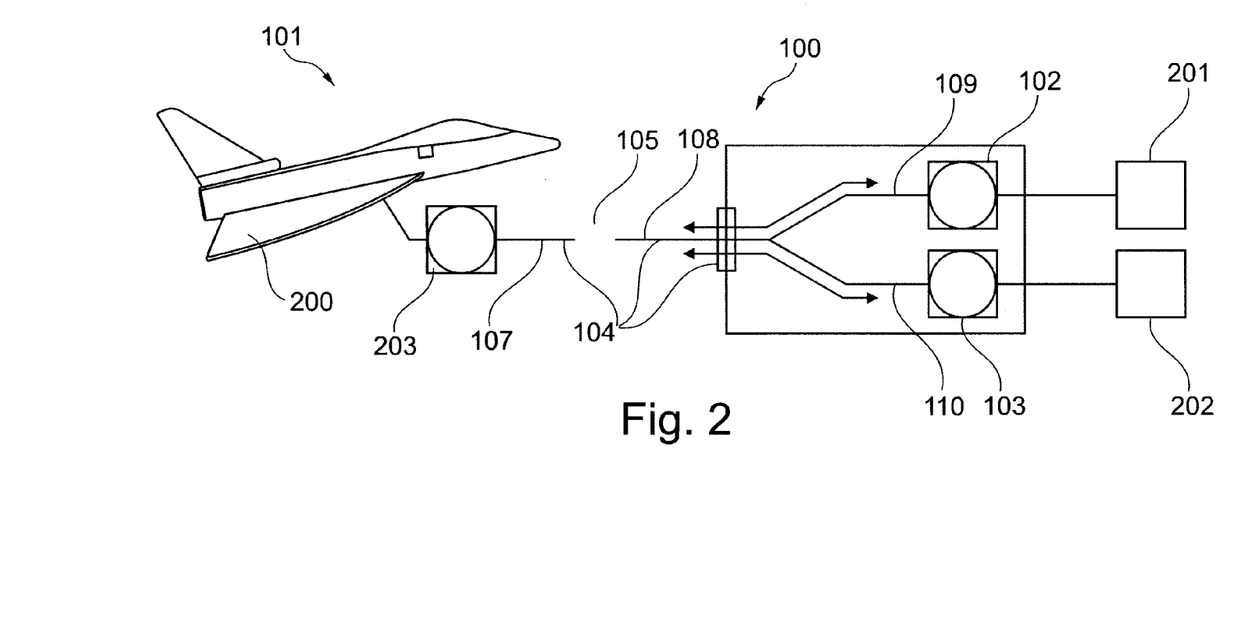

FIG. 2 shows another exemplary embodiment of an optical data transmission system 100 according to the present invention. The optical data distributor that has an optical maintenance port 203 is shown here as the device 101 in an aircraft 200. Reference numeral 203 is the optical ground port for maintenance. This is a plug connector, which is accessible only on the ground, to establish a connection to the data buses of the aircraft for the purpose of maintenance, which also includes testing and/or software updates. This may also be referred to as the ground test port or the central loading port.

In a manner similar to that in FIG. 1, a first optical maintenance port 102 and the second optical maintenance port 103 are shown. Likewise a solid-state bound data line 104 having a gap 105 is also shown. The first segment 107, the second segment 108, the third segment 109 and the fourth segment 110 of the solid-state bound data line 104 are illustrated in the aircraft 200 in a manner similar to that of the data transmission system 100 in FIG. 1. In addition, a diagnostic module 201 designed for readout of the computer system and/or for diagnosing the aircraft is also shown. Furthermore, a recording module 202 that is connected to the second optical maintenance port 103 is also shown. This module 202 is capable of recording the communication between the aircraft 200 and the diagnostic module 201 in real time and can also communicate with the diagnostic module 201, if desired, through the combination of the optical splitter used and the gap. This can also take place in the reverse manner.

Figure 3:
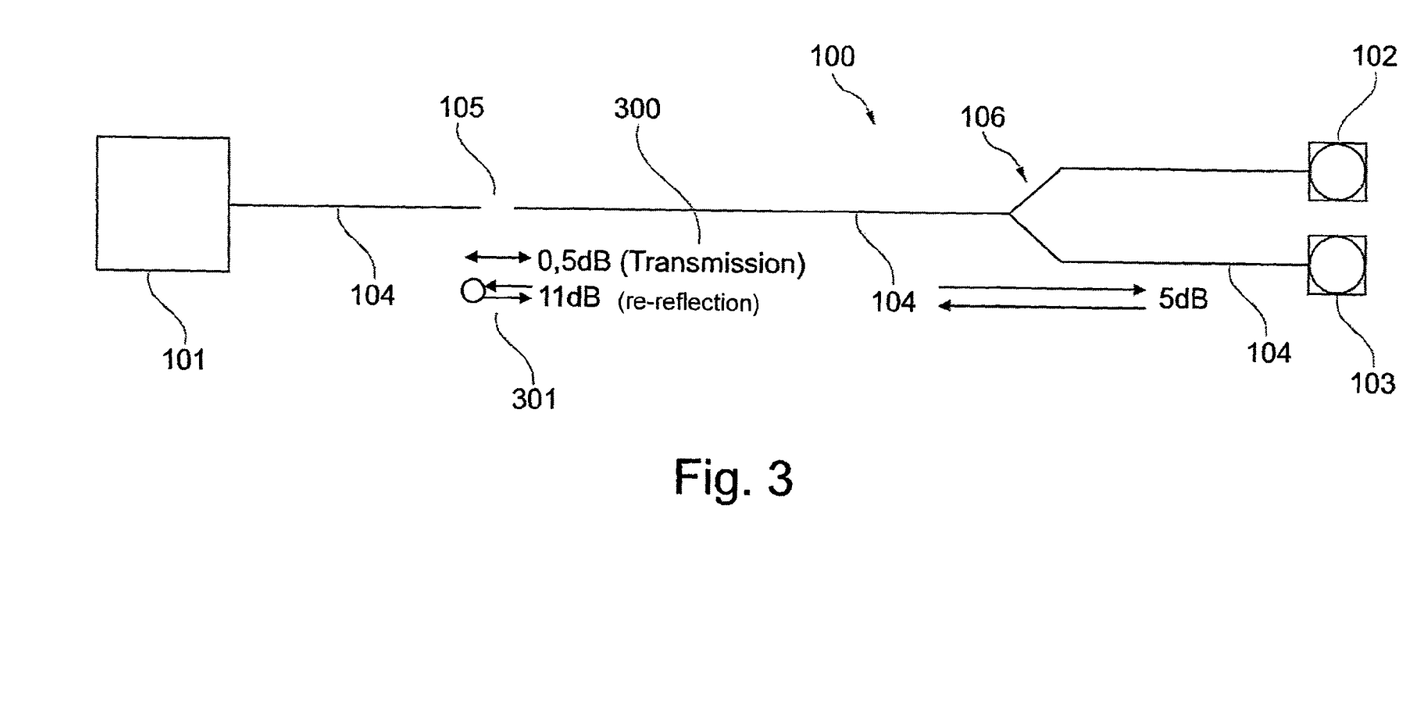

According to another exemplary embodiment of the invention, FIG. 3 shows an optical data transmission system 100 having a gap 105 and also an optical signal splitter 106. The solid-state bound data line 104 transmits the electromagnetic signals from the device 101 to and from the optical maintenance ports 102 and 103 in the manner already revealed in the exemplary embodiments described with respect to FIGS. 1 and 2. Exemplary values for transmission to the gap are labeled here with reference numeral 300 and the value for reflection on the gap is labeled with reference numeral 301, these being typical values for a simple air gap.

Figure 4:
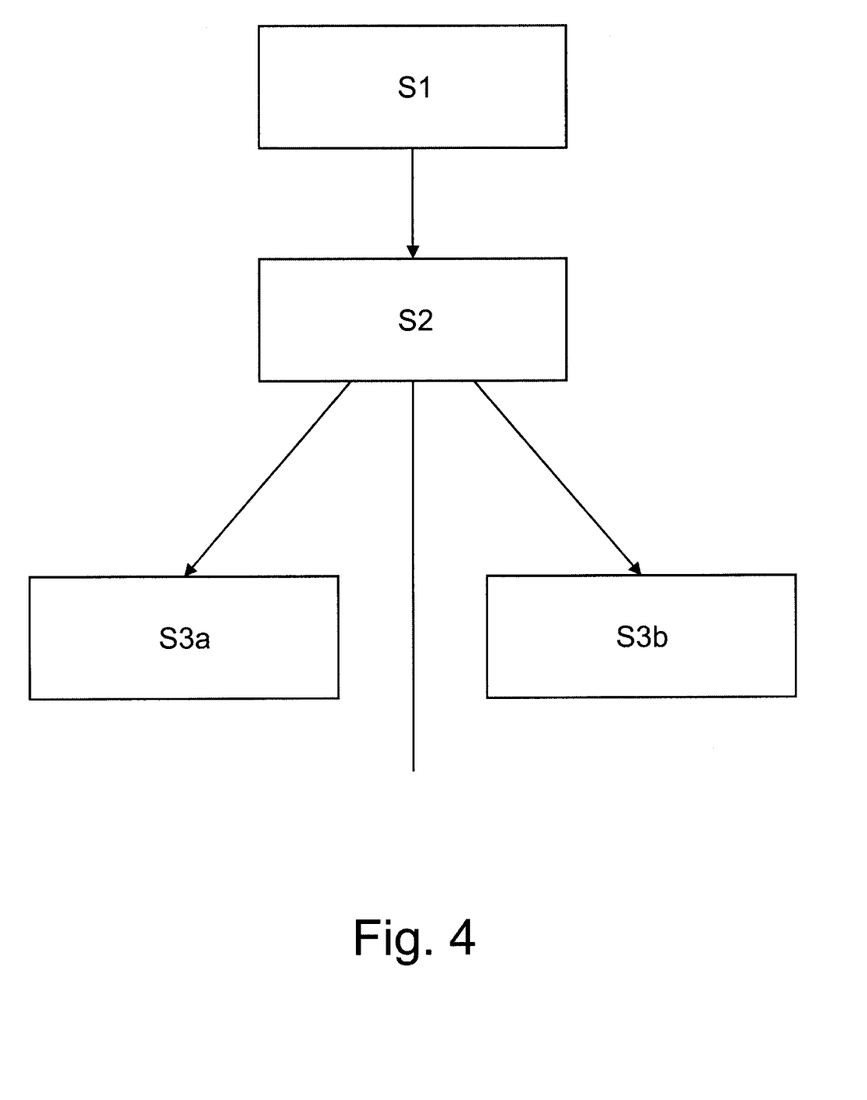
FIGS. 4 to 6 show flow charts of methods according to different exemplary embodiments of the invention.

FIG. 4 shows a flow chart of a method for readout of data of a devise such as an aircraft according to one exemplary embodiment of the invention. The method shown there has as step S1 providing a gap in a solid-state data such that the data line is situated between a device on the one hand and a first and second optical maintenance port on the other hand. This method also has as step S2 the transmission of an electromagnetic signal between the device and the first optical maintenance port via the solid-state bound data line. The transition may take place in a first direction from the device to the first optical maintenance port and the transmission may take place in a second direction from the first optical maintenance port to the device. The method according to the invention here has two different third steps S3a and S3b that are described below and may also be combined, if desired. In step S3a, the detection of an electromagnetic signal transmitted across the gap is indicated at the second optical maintenance port in the event that the transmission is in the first direction indicated above. However, if the transmission is in the second direction indicated above, then step S3b is included in the method according to the invention, said step indicating the detection of an electromagnetic signal reflected on the gap and detected at the second optical maintenance port.

Likewise, a signal that is transmitted from the first optical maintenance port to the device 101, but is reflected on the gap 105, can also be detected by providing the gap and the optical coupler on the second optical maintenance port by the method according to the invention. Thus, a communication may be provided between the two maintenance ports and at the same time communication between the device and the first maintenance port can be documented at the second maintenance port and recorded. This can increase the reliability of the diagnostic procedure on an aircraft.

Figure 5:
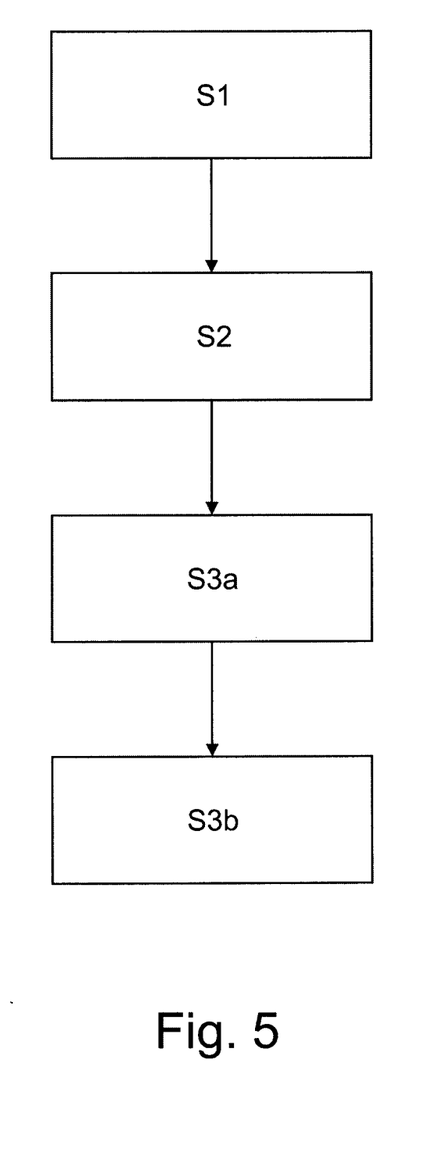

FIG. 5 shows another flow chart of a method for readout of data from a device, said method comprising four steps S1, S2, S3a and S3b. The steps S1, S2, S3a and S3b here correspond to the method steps indicated previously with respect to FIG. 4. However, in this exemplary embodiment of FIG. 4, it is shown that the method according to the invention also allows a combination of the steps S3a and S3b. In other words, the method according to the invention is capable of recording any communication between the device and the first optical maintenance port.

Figure 6:
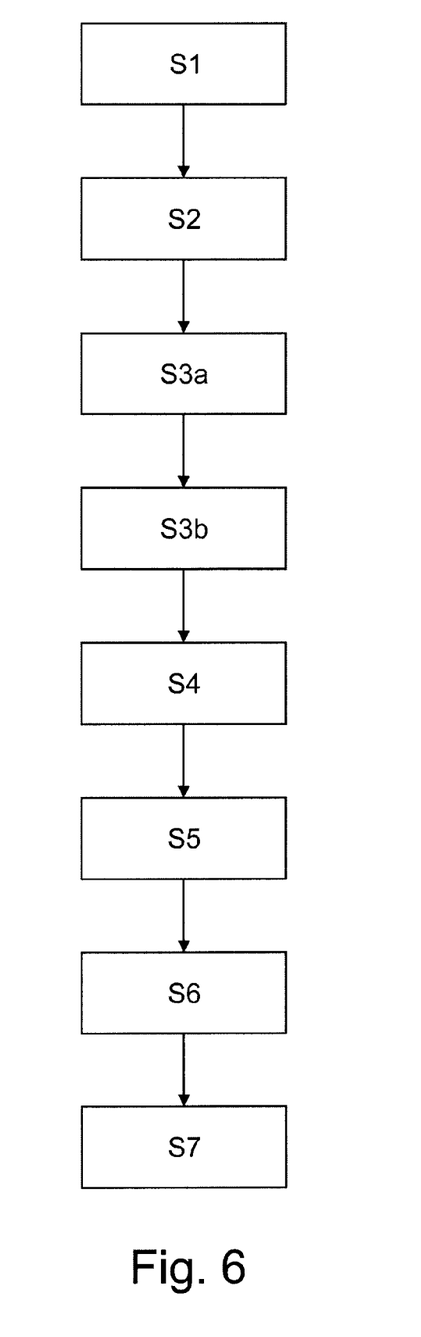

According to another exemplary embodiment of the invention, a flow chart of a method for readout of data of a device is shown in FIG. 6. The first four method steps S1 through S3b are given here in a manner similar to that in the exemplary embodiment in FIG. 5, to which reference is herewith made. The additional method step S4 includes providing a device, a first optical maintenance port and a second optical maintenance port. In addition, the step S5 includes providing a solid-state bound data line for transmission of data by means of electromagnetic energy between the device and the first optical maintenance port and the second optical maintenance port. In method step S6 an electromagnetic signal that is transmitted through the gap or reflected on the gap is recorded at the second optical maintenance port. This permits monitoring of the communication between the first optical maintenance port and the device. By means of step S7, communication between the first optical maintenance port and the second optical maintenance port is achieved by means of an electromagnetic signal reflected on the gap. In other words, a method of diagnosing defects in an airplane, for example, is provided here, implementing the advantages described above by means of a gap and/or a transmission reflector.

Figure 7:
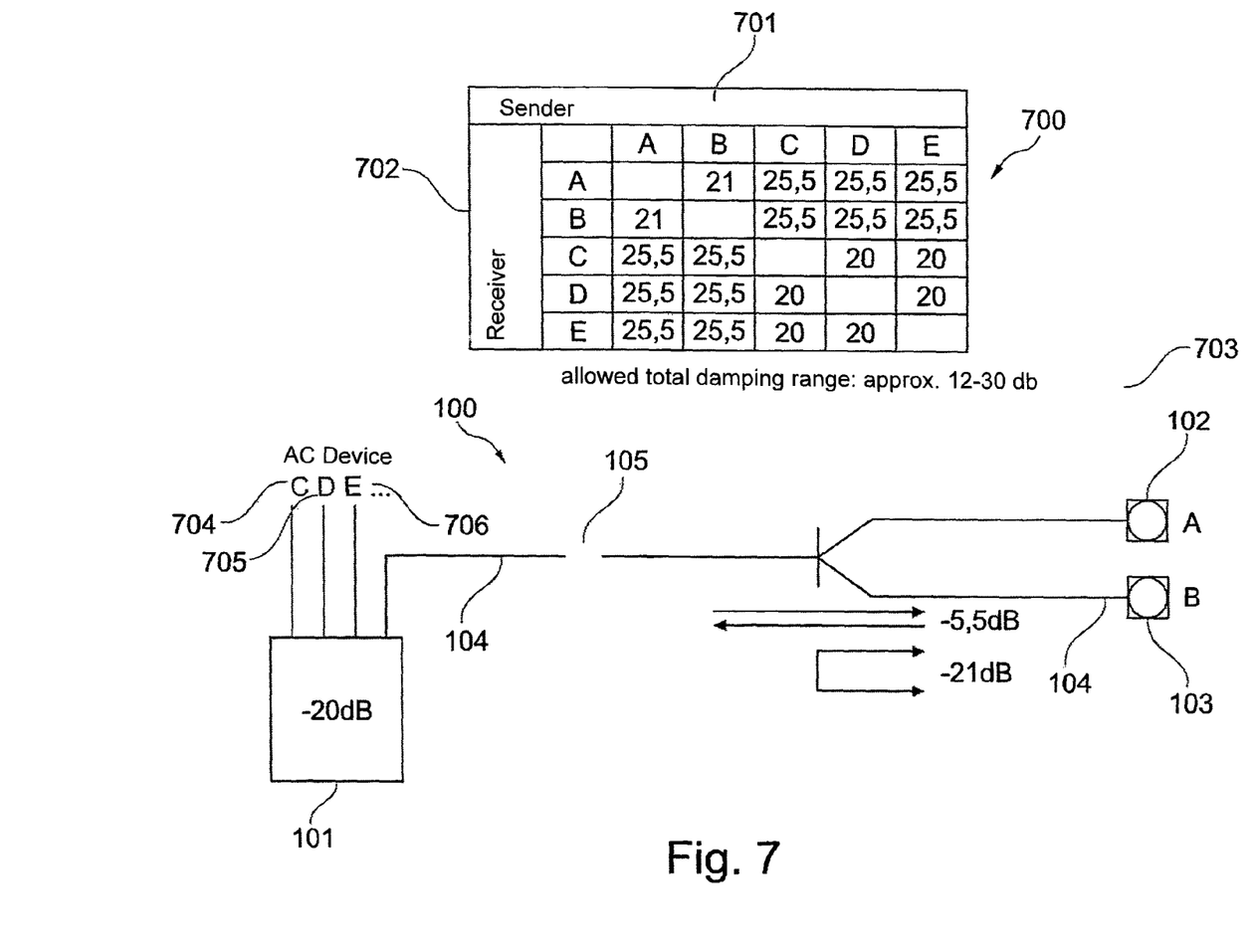
FIG. 7 shows a schematic two-dimensional diagram of an optical data transmission system according to an exemplary embodiment of the invention.

FIG. 7 shows an optical data transmission system 100 having a device 101. The device 101 contains multiple instruments 704, 705 and 706 which are connected by an optical data distributor. These instruments 704, 705 and 706 can be read out by the solid-state bound data line 104 via the optical maintenance ports 102 and 103 and/or instruments connected there. Because of the gap 105, this can be detected and recorded at the respective optical maintenance port parallel to this one. If desired, a parallel and synchronous readout of two instruments 704, 705 and 706 may also be performed, because two optical maintenance ports are available. In addition, a table 700 showing examples of damping values for a transmitter situation and a receiver situation for the optical maintenance ports 102 and 103 is given. These are labeled as A and B here. The respective internal instruments within the respective airplane are labeled as C, D and E . . . . For example, an allowed total damping range that extends here between the values of 12 dB and 30 dB, for example, is also given. This allowed total damping range is labeled with reference numeral 703. The transmitters are labeled as 701 and the receivers are labeled as 702. Since the solid-state bound data line and thus the optical data transmission system is designed by bidirectional data transmission in this and every other exemplary embodiment of the present invention, each of the elements A, B, C, D and E is represented as both a receiver and as a transmitter.

The values given in FIG. 7 are examples and may be varied without going beyond the core of the invention. For one exemplary embodiment of the invention having the following properties, the values given in FIG. 7 may prove advantageous: 810 nm wavelength, a simple air gap 15 micrometers long, a multimode 200/280 micrometer glass fiber with a numeric aperture of 0.24. A so-called star coupler, which is installed in the airplane is labeled as 101 and typically has a damping of 20 dB. However, other values for the damping are also possible on such a star coupler, if desired.

Figure 8A:
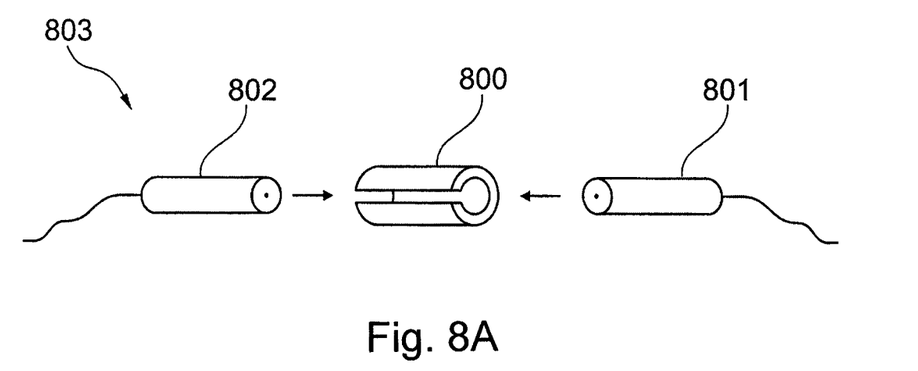
FIGS. 8A and 8B show schematic two-dimensional diagrams of a sleeve for producing a gap according to an exemplary embodiment of the invention.
Figure 8B:
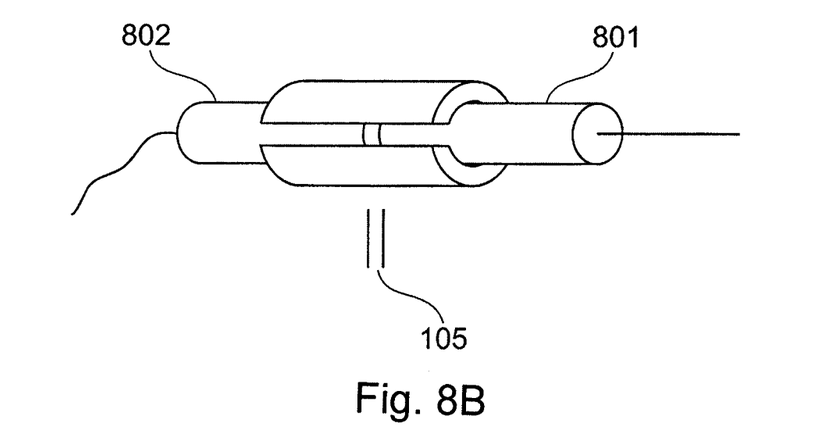

FIGS. 8A and 8B show schematic two-dimensional diagrams of a sleeve 800 for producing a gap 105. The sleeve 800 shown here is made of zirconia. This also shows that the solid-state bound data line 803 is interrupted by the gap 105 between the device (not shown) on the one hand and the first and second optical maintenance ports (not shown) on the other hand. Furthermore, the two ends 801 and 802 of the solid-state bound data line are also shown. These are also made of zirconia at the ends. Other material combinations are also possible, if desired. The two ends may, if desired, be bonded to the sleeve to produce a permanent gap 105.

Figure 9:
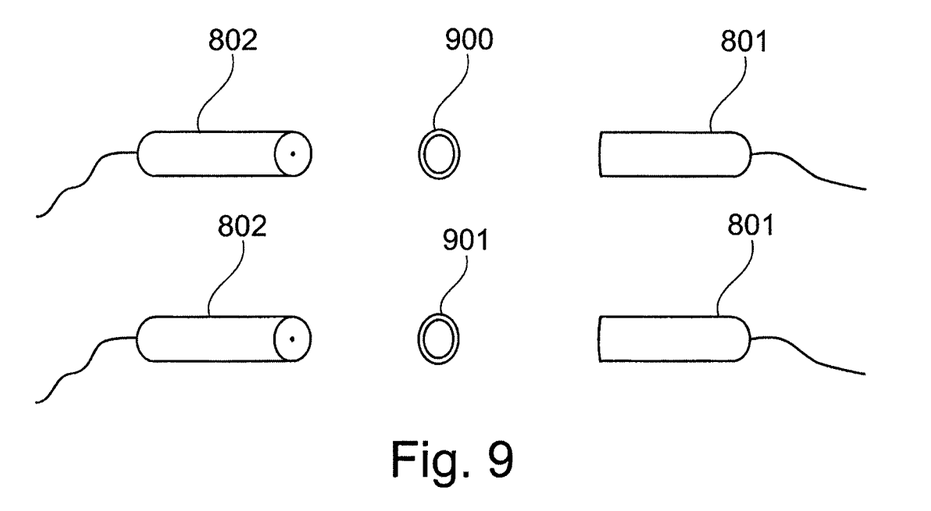
FIG. 9 shows a schematic two-dimensional diagram of a spacer ring and a wafer for producing a gap according to an exemplary embodiment of the invention.

FIG. 9 shows a schematic two-dimensional diagram of a spacer ring 900, which may be made of zirconia or a plastic film, for example, to produce a gap. The sleeve may also be made of a ceramic. The sleeve may also be made of a metalized plastic film. This may be advantageous in particular when using short-lived add-on components having a high breakdown damping and a low re-reflection. A wafer 901 for producing a gap is also shown.

Figure 10:
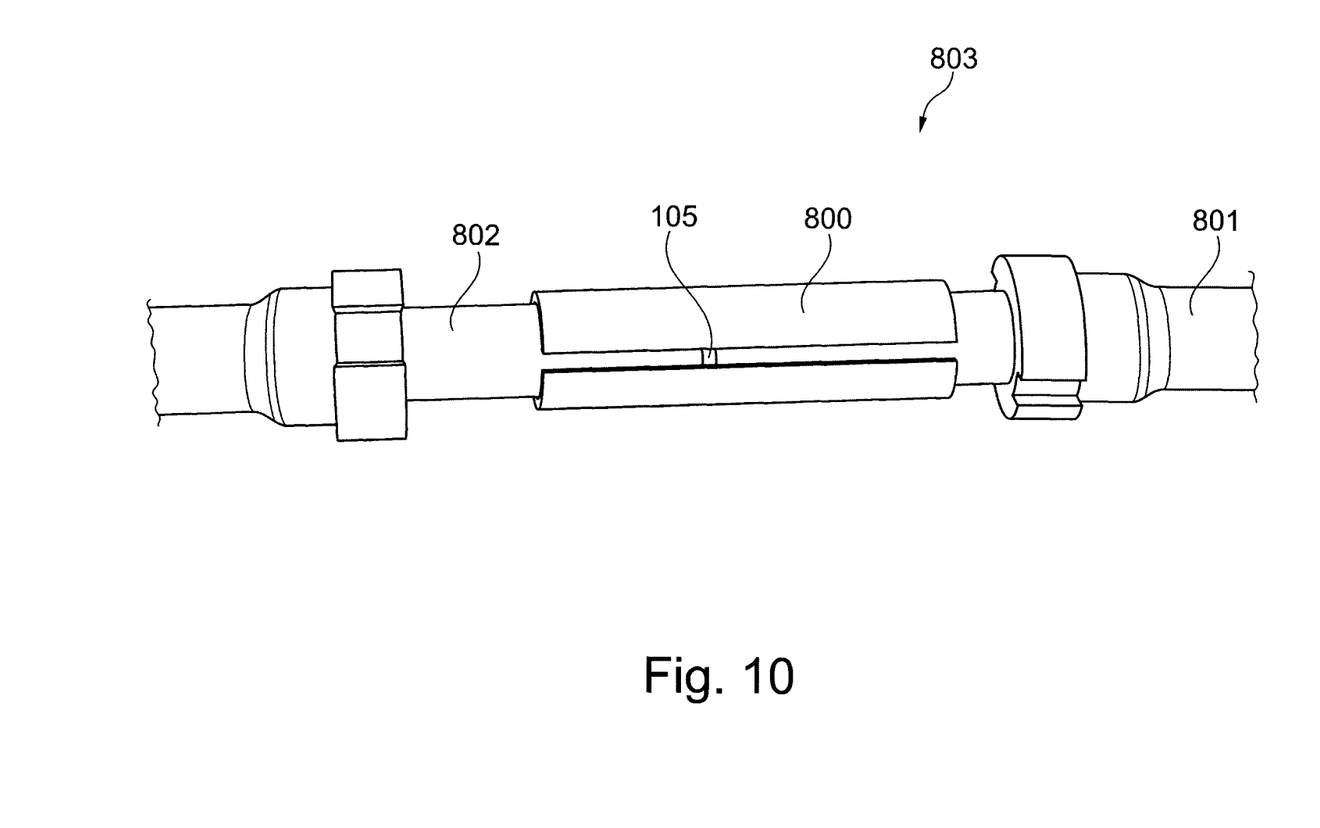
FIG. 10 shows a schematic two-dimensional diagram of a zirconia sleeve for producing a gap according to an exemplary embodiment of the invention.

FIG. 10 shows a schematic two-dimensional diagram of a zirconia sleeve 800 for producing a gap 105 according to one exemplary embodiment of the invention. The ends 801 and 802 of the solid-state guideline 803 are also shown. If desired, zirconia may also be used as the gap material instead of air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An optical data transmission system comprising:
   a device;
   a first optical maintenance port;
   a second optical maintenance port;
   an optical signal splitter coupled to each of the first optical maintenance port and second optical maintenance port; and
   a solid-state bound data line, coupled to the device and the optical signal splitter, the solid-state bound data line configured to transmit data using electromagnetic energy between the device and the first optical maintenance port and the second optical maintenance port, wherein the solid-state bound data line is interrupted by a gap between (i) the device and (ii) the optical signal splitter, wherein the gap is configured to transmit electromagnetic signals between the device and the optical signal splitter, and to reflect electromagnetic signals emanating from the first optical maintenance port to the second optical maintenance port, by way of the optical signal splitter, thereby further enabling data transmission between the first optical maintenance port and the second optical maintenance port.

2. The optical data transmission system according to claim 1, wherein the solid-state bound data line is a fiber optic data line at least directly before and directly after the gap.

3. The optical data transmission system according to claim 1, wherein a first segment and a second segment of the data line are configured in conjunction with the gap such that a damping of the electromagnetic energy occurs in a transmission of electromagnetic energy across the gap, this damping being selected from the group consisting of 0.2 dB, 0.5 dB, 1.0 dB, 1.5 dB, 2.0 dB, 2.5 dB, 3.0 dB.

4. The optical data transmission system according to claim 1, wherein a first segment and a second segment of the data line are configured in conjunction with the gap, such that damping of the electromagnetic energy occurs in reflection of electromagnetic energy, which is reflected on the gap after coming from an optical maintenance port, this damping being selected from the group consisting of 6 dB, 6.5 dB, 7.0 dB, 7.5 dB, 8.0 dB, 8.5 dB, 9.0 dB, 9.5 dB, 10.0 dB, 10.5 dB, 11 dB, 11.5 dB, 12 dB, 12.5 dB, 13.0 dB, 13.5 dB and 14.0 dB.

5. An aircraft comprising:
   an optical data transmission system comprising
      a device;
      a first optical maintenance port;
      a second optical maintenance port;
      an optical signal splitter coupled to each of the first optical maintenance port and second optical maintenance port; and
      a solid-state bound data line, coupled to the device and the optical signal splitter, the solid-state bound data line configured to transmit data using electromagnetic energy between the device and the first optical maintenance port and the second optical maintenance port, wherein the solid-state bound data line is interrupted by a gap between (i) the device and (ii) the optical signal splitter, wherein the gap is configured to transmit electromagnetic signals between the device and the optical signal splitter, and to reflect electromagnetic signals emanating from the first optical maintenance port to the second optical maintenance port, by way of the optical signal splitter, thereby further enabling data transmission between the first optical maintenance port and the second optical maintenance port.

6. The aircraft according to claim 5, wherein the solid-state bound data line is a fiber optic data line at least directly before and directly after the gap.

7. The aircraft according to claim 5, wherein a first segment and a second segment of the data line are configured in conjunction with the gap such that a damping of the electromagnetic energy occurs in a transmission of electromagnetic energy across the gap, this damping being selected from the group consisting of 0.2 dB, 0.5 dB, 1.0 dB, 1.5 dB, 2.0 dB, 2.5 dB, 3.0 dB.

8. The aircraft according to claim 5, wherein a first segment and a second segment of the data line are configured in conjunction with the gap, such that damping of the electromagnetic energy occurs in reflection of electromagnetic energy, which is reflected on the gap after coming from an optical maintenance port, this damping being selected from the group consisting of 6 dB, 6.5 dB, 7.0 dB, 7.5 dB, 8.0 dB, 8.5 dB, 9.0 dB, 9.5 dB, 10.0 dB, 10.5 dB, 11 dB, 11.5 dB, 12 dB, 12.5 dB, 13.0 dB, 13.5 dB and 14.0 dB.

9. A method for readout of data from a device, said method comprising the steps:
   providing an optical signal splitter coupled to each of a first and second optical maintenance port;
   providing a gap in a solid-state bound data line, which is situated between (i) a device and (ii) the optical signal splitter;
   transmitting an electromagnetic signal between the device and the optical signal splitter via the solid-state bound data line, wherein the transmission occurs in a first direction from the device to the first and second maintenance ports, via the optical signal splitter, and the transmission occurs in a second direction from the first and second maintenance ports, via the optical signal splitter, to the device; and
   detecting an electromagnetic signal transmitted via the gap and the optical signal splitter at least the second optical maintenance port if the transmission is in the first direction, and
   detecting an electromagnetic signal reflected on the gap at the second optical maintenance port, via the optical signal splitter, if the transmission is in the second direction.

10. The method according to a claim 9, further comprising the step:
   monitoring a communication between the first optical maintenance port and the device by recording, at the second optical maintenance port, an electromagnetic signal reflected on the gap and received at the second optical maintenance port via the optical signal splitter.

11. The method according to claim 9, further comprising the step:

communicating between the first optical maintenance port and the second optical maintenance port, via the optical signal splitter, using an electromagnetic signal reflected on the gap.

* * * * *